(12) United States Patent
Mannsfeld et al.

(10) Patent No.: US 12,043,217 B2
(45) Date of Patent: Jul. 23, 2024

(54) VARIABLE HITCH MOUNT AND PLATFORM FOR STOWING AND DEPLOYING VEHICLE CARGO

(71) Applicants: Christian Mannsfeld, Granite Bay, CA (US); Bennett Dahl, Sacramento, CA (US)

(72) Inventors: Christian Mannsfeld, Granite Bay, CA (US); Bennett Dahl, Sacramento, CA (US)

( * ) Notice: Subject to any disclaimer, the term of this patent is extended or adjusted under 35 U.S.C. 154(b) by 25 days.

(21) Appl. No.: 17/622,740

(22) PCT Filed: Jun. 26, 2020

(86) PCT No.: PCT/US2020/039995
§ 371 (c)(1),
(2) Date: Dec. 24, 2021

(87) PCT Pub. No.: WO2020/264430
PCT Pub. Date: Dec. 30, 2020

(65) Prior Publication Data
US 2022/0161735 A1 May 26, 2022

Related U.S. Application Data

(60) Provisional application No. 62/867,111, filed on Jun. 26, 2019.

(51) Int. Cl.
*B60R 9/06* (2006.01)
*E04H 15/06* (2006.01)

(52) U.S. Cl.
CPC ............... *B60R 9/06* (2013.01); *E04H 15/06* (2013.01)

(58) Field of Classification Search
CPC .................................. B60R 9/06; E04H 15/06
USPC ....................................................... 224/486
See application file for complete search history.

(56) References Cited

U.S. PATENT DOCUMENTS

| | | | | |
|---|---|---|---|---|
| 5,228,607 A * | 7/1993 | Tolsdorf | .................... | B60R 9/06 224/520 |
| 5,388,736 A * | 2/1995 | Schmidt | .................... | B60R 9/12 224/520 |
| 5,531,283 A * | 7/1996 | Austin | ................. | A01B 71/066 180/53.3 |
| 5,950,892 A * | 9/1999 | Tsai | ......................... | B60R 9/10 224/520 |
| 6,179,368 B1 * | 1/2001 | Karlsson | ................. | E04H 15/06 135/88.13 |
| 6,234,961 B1 * | 5/2001 | Gray | .................. | A61B 17/0293 600/234 |
| 6,511,088 B2 * | 1/2003 | Kahlstorf | ................. | B60D 1/52 280/415.1 |
| 6,511,090 B2 * | 1/2003 | Quanbeck | ................ | B60D 1/54 280/491.1 |
| 6,971,565 B2 * | 12/2005 | Wang | ........................ | B60R 9/06 224/520 |

(Continued)

*Primary Examiner* — Peter N Helvey

(57) ABSTRACT

A vehicle hitch mount having a variably deployable orientation for stowing and positioning cargo while retaining the cargo to a receiver hitch in a fixed and secure relation to the vehicle. The cargo may be attached to the vehicle hitch mount with a releasable receiving element, and may comprise a number of different deployable/receivable items (e.g. tent, workstation, miniature vehicle, etc.), particularly where orientation of such cargo item is needed, whether in a deployed or stowed state.

17 Claims, 9 Drawing Sheets

(56) References Cited

U.S. PATENT DOCUMENTS

| | | | | |
|---|---|---|---|---|
| 7,290,670 B2* | 11/2007 | Huang | ................... | B60R 9/10 |
| | | | | 211/17 |
| 7,819,128 B2* | 10/2010 | Clark | ................... | A45B 11/00 |
| | | | | 280/491.1 |
| 7,938,431 B1* | 5/2011 | Snyder | ................... | B60D 1/01 |
| | | | | 280/491.5 |
| 9,855,803 B2* | 1/2018 | Rimmelspacher | ..... | B60D 1/065 |
| 9,945,148 B1* | 4/2018 | Schell | ................... | E04H 15/06 |
| 10,059,159 B2* | 8/2018 | Law | ................... | B60D 1/025 |
| 11,686,331 B2* | 6/2023 | Cakici | ................... | B60R 9/10 |
| | | | | 403/322.4 |
| 2002/0008364 A1* | 1/2002 | Kahlstorf | ............... | B60D 1/075 |
| | | | | 280/515 |
| 2004/0164518 A1* | 8/2004 | Staggs | ................... | B60D 1/60 |
| | | | | 280/507 |
| 2009/0057522 A1* | 3/2009 | Bedell/Fiore | ............ | B62H 3/12 |
| | | | | 29/525.11 |
| 2010/0294819 A1* | 11/2010 | Spera | ................... | B60R 9/06 |
| | | | | 224/519 |
| 2013/0093163 A1* | 4/2013 | Bernart | ................... | B60D 1/06 |
| | | | | 280/511 |
| 2019/0168555 A1* | 6/2019 | Axelson, Jr. | ........... | B60D 1/665 |

* cited by examiner

VARIABLE HITCH MOUNT AND PLATFORM FOR STOWING AND DEPLOYING VEHICLE CARGO

CROSS-REFERENCE TO RELATED APPLICATIONS

This application claims priority to, and the benefit of, U.S. provisional patent application Ser. No. 62/867,111 filed on Jun. 26, 2019 incorporated herein by reference in its entirety.

BACKGROUND

1. Technical Field

The present description relates generally to a hitch mount for vehicles, and more particularly to a hitch mount having a variably deployable orientation for deploying cargo such as a hitch tent.

2. Background Discussion

Vehicle mounted tent platforms have become an increasingly popular option for recreational camping. Generally, the tent is coupled to a rack on the top of a vehicle. This can present problems for some campers, as accessing the tent at the height of the vehicle can be cumbersome and dangerous. Many hitch mounts exist for carrying cargo (e.g. bikes, containers, etc.) via a receiver hitch of the vehicle. However, these systems have limited deployment options, particularly with respect to orientation of cargo item while being stowed or deployed.

BRIEF SUMMARY

An aspect of the present description is a vehicle hitch mount having a variably deployable orientation for stowing and positioning cargo while retaining the cargo to a receiver hitch in a fixed and secure relation to the vehicle. The mount comprises a receiver arm sized for insertion into a vehicle receiver hitch (also interchangeably referred to as a hitch receiver), and a moveable cargo arm having a ball that is releasably captured by releasable clamshell retention mechanism coupled to the receiver arm. The cargo may be releasably attached to the vehicle hitch mount with a via the cargo arm, and may comprise a number of different deployable/receivable items (e.g. tent, workstation, miniature vehicle, etc.), particularly where orientation of such cargo item is needed, whether in a deployed or stowed state.

In one embodiment, the cargo comprises a retractable/expandable enclosure in the form of a hitch-based tent. The variable hitch mount allows the hitch tent to be secured in a collapsed, vertical orientation while the hitch tent is in a collapsed configuration behind the vehicle. When the user arrives at a desired destination (e.g. camping location or the like), the variable hitch mount allows for micro-variable release of a clamping assembly within the variable hitch mount so that the tent platform may be positioned and/or deployed to a desired orientation with respect to the vehicle and/or a deployed surface or ground.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Figure 5:
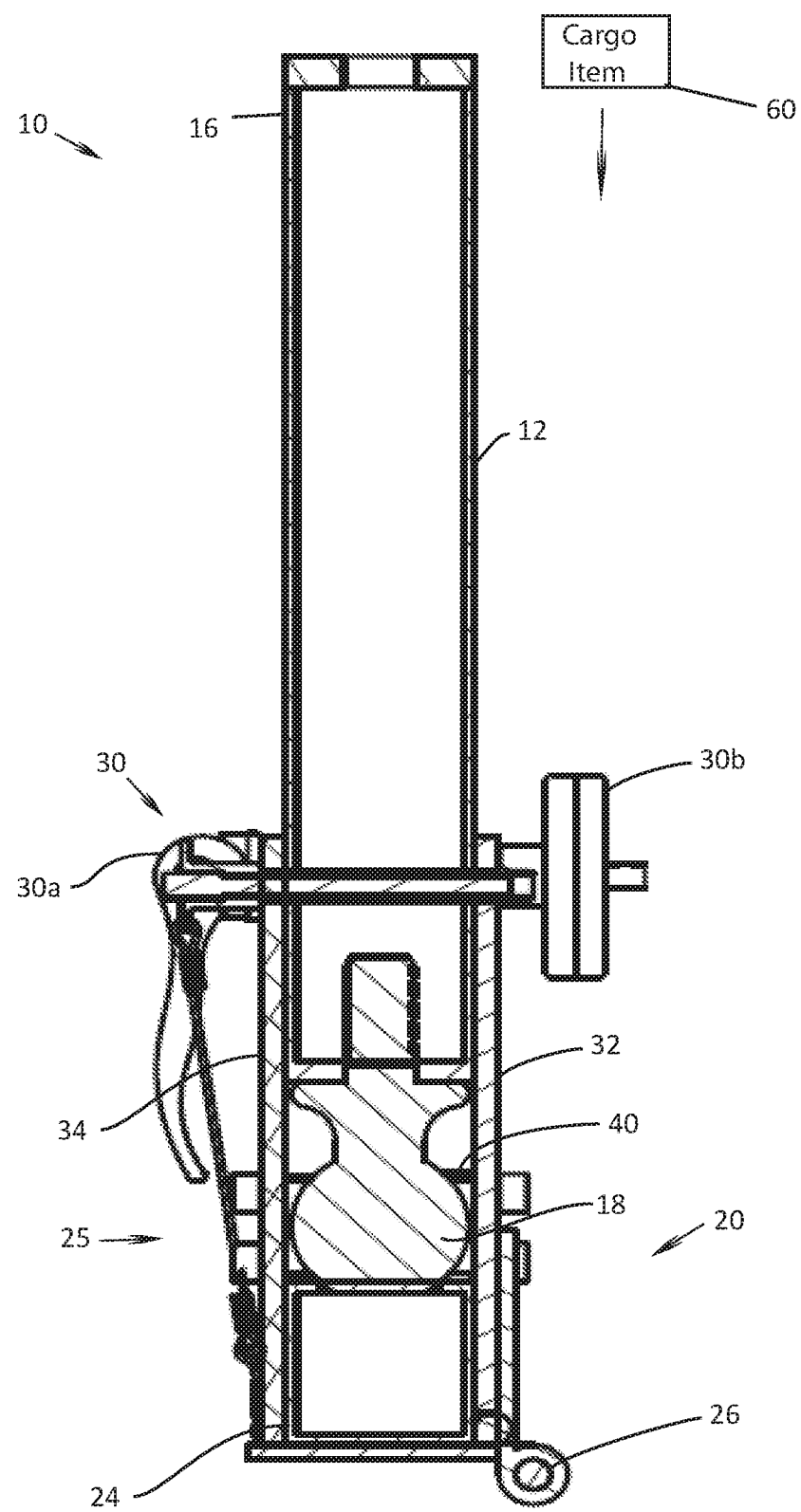
FIG. 5 is section view of variable hitch mount of FIG. 1 with movable cargo arm in a stowed orientation and releasable retention mechanism in a closed position.
Figure 6:
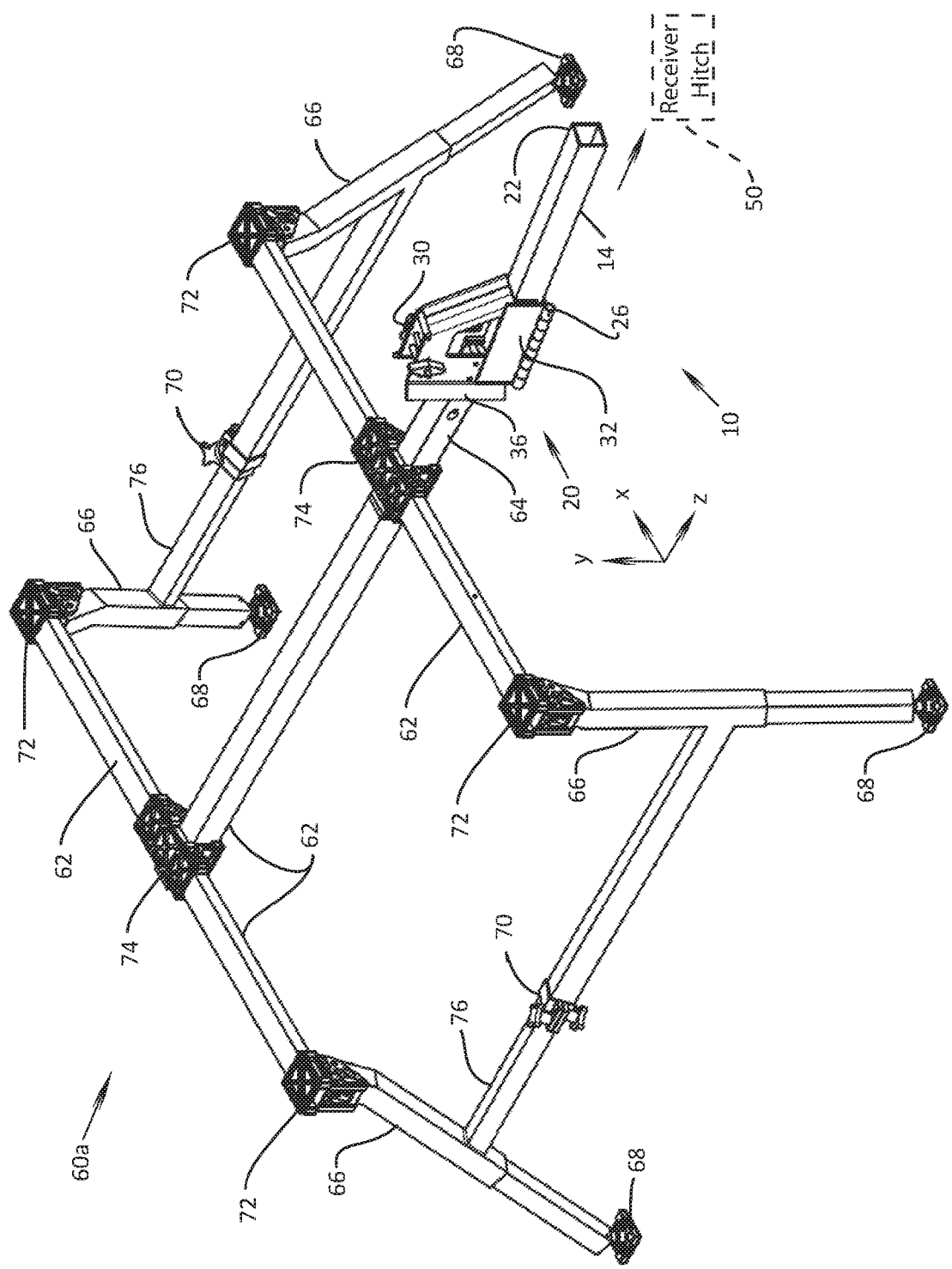
FIG. 6 is a perspective view of the variable hitch mount of FIG. 1 with movable cargo arm in a deployed orientation and coupled to a deployed hitch tent frame.

The present description, detailed in FIGS. 1 to 9 below, is directed to a variable hitch mount for carrying and deploying cargo with a vehicle. In FIG. 6 and FIG. 9, the variable hitch mount is shown with attachment to a hitch-based tent as the primary cargo component or item. However, it is appreciated that the variable hitch mount 10 and 100 detailed below may be implemented with any number of cargo-carrying options, e.g. a bike rack, miniature vehicle platform, workstation, rack, cargo box, or the like.

Furthermore, "cargo item" is herein defined broadly to mean any item or structure attached to the vehicle. For example, a cargo item may comprise a trailer that is attached the vehicle through the variable hitch mount. In such embodiment the cargo arm 12 would be coupled to extend from the trailer with the ball 18 being oriented horizontal toward the receiver hitch 50 instead of the typical vertical orientation attached directly to the receiver.

Referring to the images shown in FIG. 1 through FIG. 5, variable hitch mount 10 generally comprises two primary members that articulate with each other to form the hitch mount: 1) a receiving arm 14 having a first end 22 sized for insertion into an opening (e.g. for 1¼"×1¼" or 2"×2 square tubing) of a vehicle receiver hitch 50 and a second end 24 with a clamshell releasable retention assembly or mechanism 20, and 2) a moveable cargo arm 12 having a distal end 16 composed of rectangular or square tubing for coupling to a cargo item 60a (see FIG. 6 and FIG. 9), and a proximal end terminating at a spherical or ball mount 18.

Figure 1:
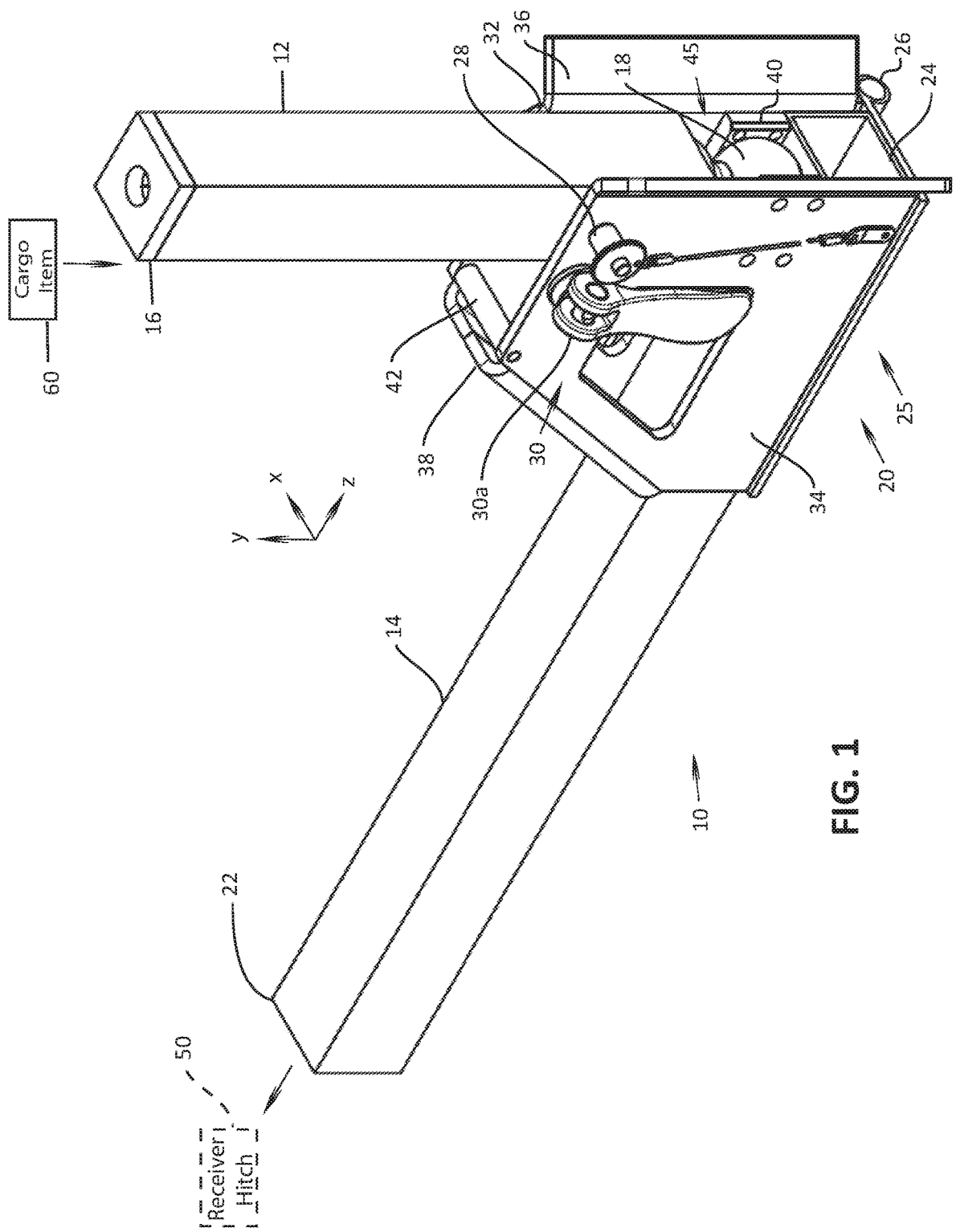
FIG. 1 is a perspective view of the variable hitch mount with movable cargo arm in a stowed orientation in accordance with the present description.
Figure 2:
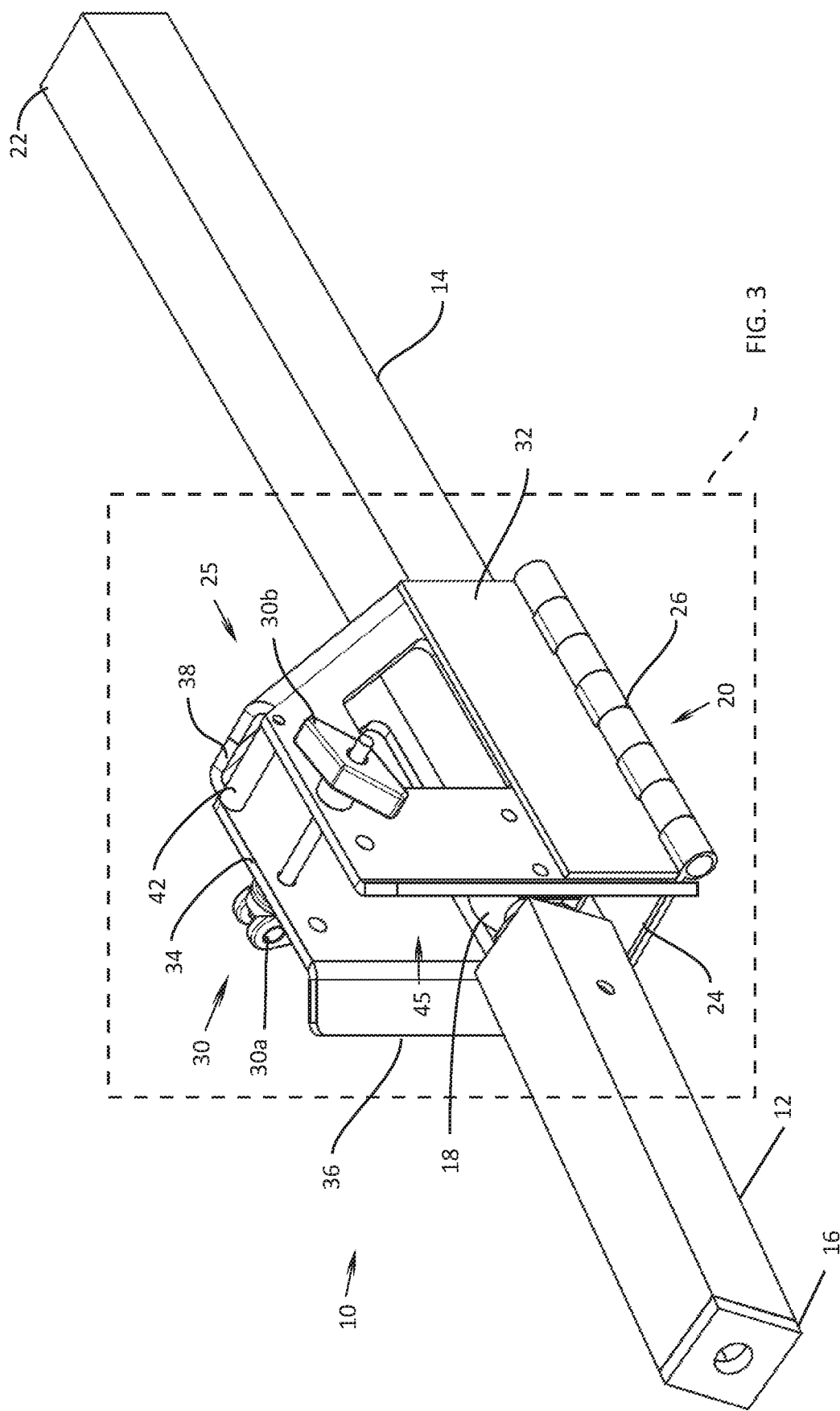
FIG. 2 is a perspective view of the variable hitch mount of FIG. 1 with movable cargo arm in a deployed orientation.
Figure 3:
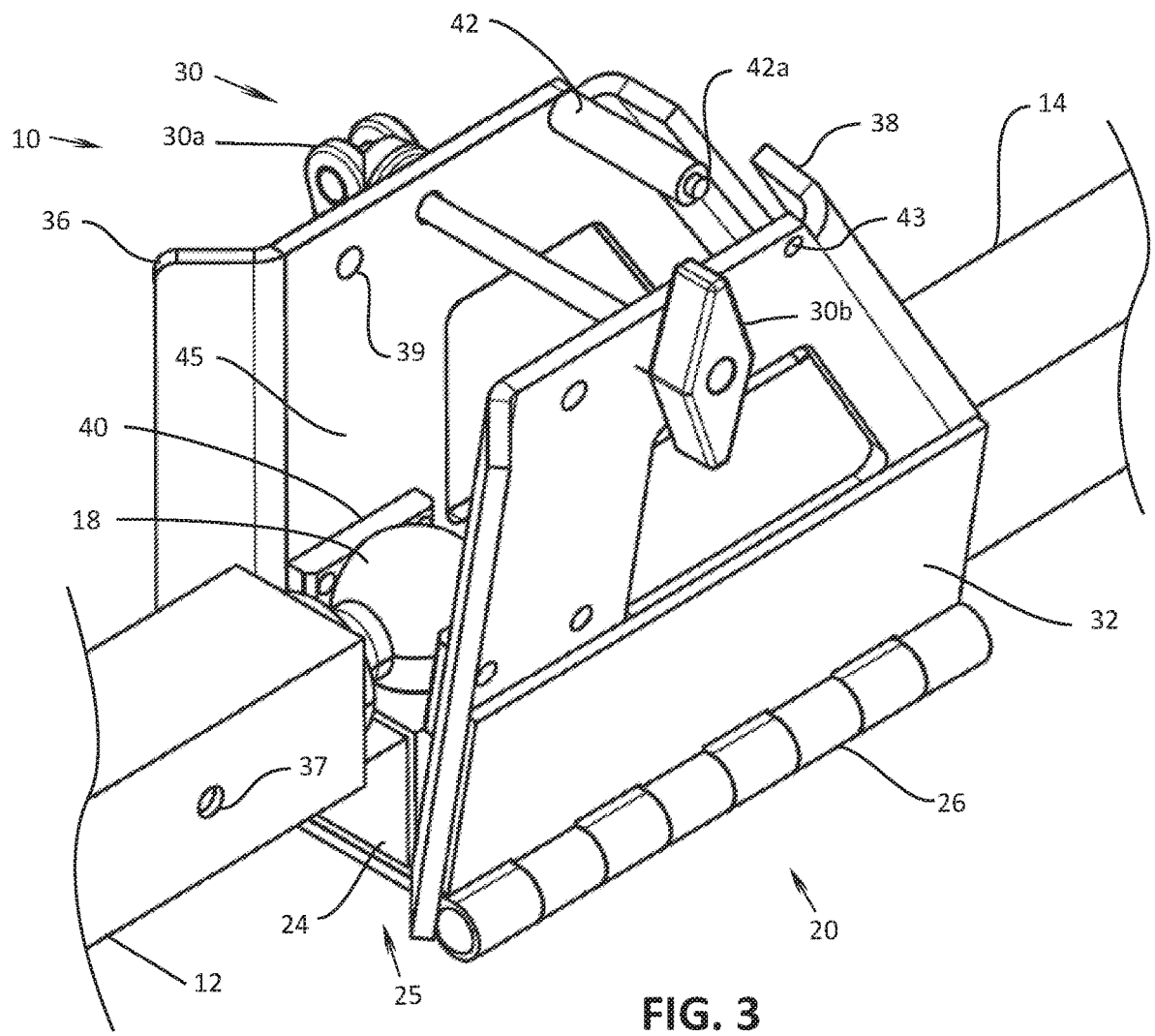
FIG. 3 is a perspective view of the variable hitch mount of FIG. 1 with movable cargo arm in a deployed orientation and releasable retention mechanism in an open position.
Figure 4:
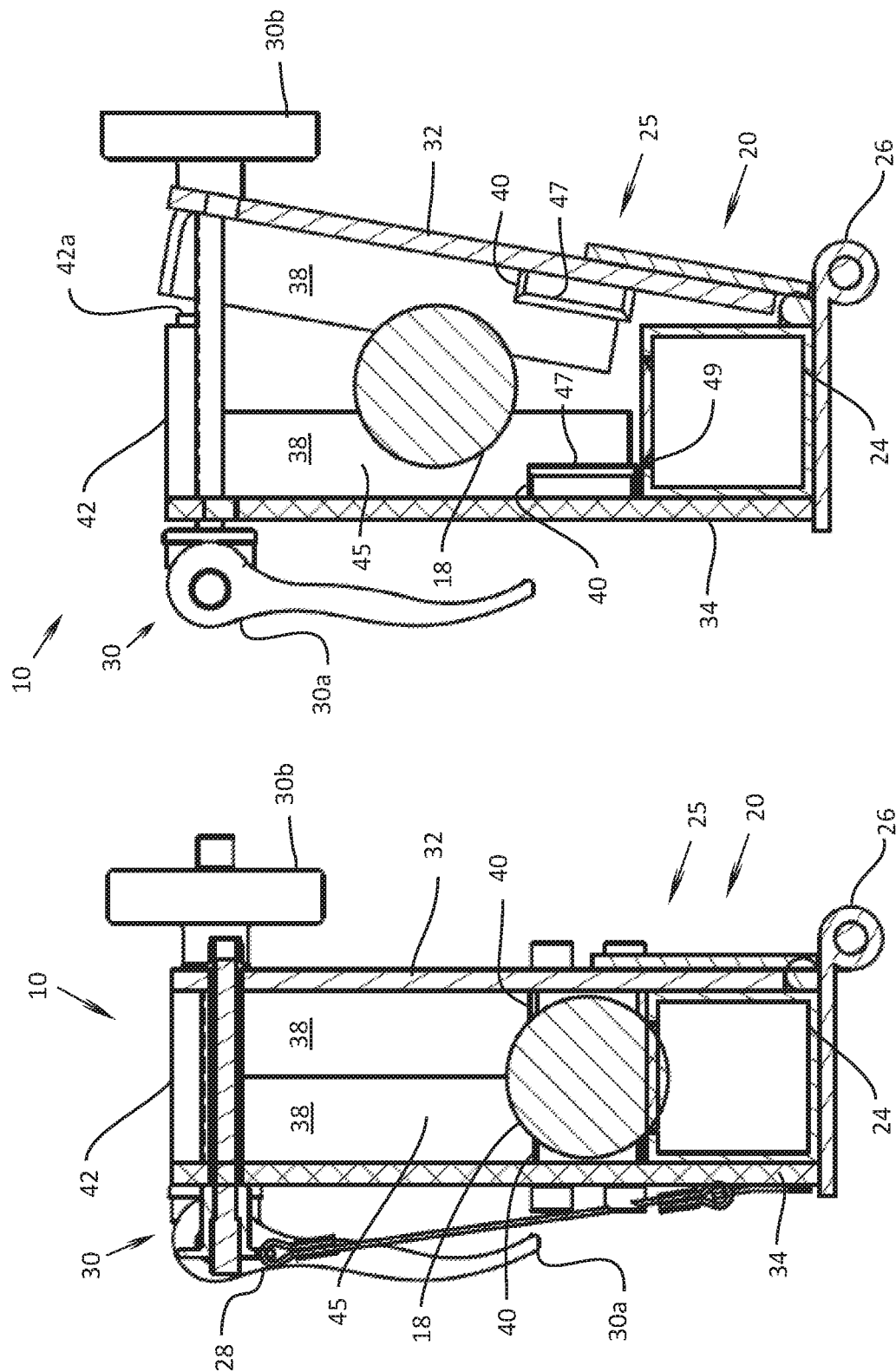
FIG. 4A is section view of variable hitch mount of FIG. 1 with movable cargo arm in a deployed orientation and releasable retention mechanism in a closed position.
FIG. 4B is section view of variable hitch mount of FIG. 1 with movable cargo arm in a deployed orientation and releasable retention mechanism in an open position.

FIG. 1 shows a perspective view of the variable hitch mount 10 with the movable cargo arm 12 in a stowed orientation. FIG. 2 is a perspective view of the variable hitch mount of 10 with movable cargo arm 12 in a deployed orientation. FIG. 3 is a perspective view of the variable hitch mount 10 with movable cargo arm 12 in a deployed orientation and clamshell releasable retention mechanism 20 in an open position. FIG. 4A and FIG. 4B show section views of the variable hitch mount 10 with movable cargo arm 12 in a deployed orientation and clamshell releasable retention mechanism 20 in closed and open positions, respectively. FIG. 5 is section view of variable hitch mount 10 with movable cargo arm 12 in a stowed orientation and clamshell releasable retention mechanism 20 in a closed position.

The releasable retention mechanism 20 comprises a clamshell housing 25 defined by a bottom end that supports the square tubing of end 24 of receiving arm 14 and two side walls 32, and 34 that form a cavity 45 having an open top end and open front end for receiving and reciprocation of the ball mount 18 of the moveable cargo arm 12. In the configuration shown in FIG. 1 through FIG. 5, the housing 25 supports the square tubing of end 24 of receiving arm 14 via a fastener, weld, or like attachment means. However it is appreciated that receiving arm 14 may be integral with housing 125. Housing 25 and side walls 32, 34 are preferably formed from a metal such as aluminum or steel or similar high load-bearing material, and in the embodiment shown in FIG. 1-5 are formed from plates that form a cavity 45 for receiving the proximal end of cargo arm 12 and ball mount 18. It is appreciated that other structures for side walls 32/34 may be employed. One side wall 34 is fixed to the receiving arm 14 and bottom end, while the second side wall 32 is rotationally attached via a hinge 26. While a one-hinge design with one moveable wall is shown in the embodiments disclosed herein, it is appreciated that a pair of moveable walls (e.g. employing a second hinge (not shown) opposite hinge 26). Additional moveable walls may also be incorporated (e.g. see door 154 in FIG. 7A through FIG. 8B that rotates to open or close the front opening of the housing cavity). The internal surfaces of the side walls 32/24 comprise opposing retainer pads 40 having cupped surfaces 47 that are shaped to mate with the spherical surface of the ball mount (see FIG. 4B). It is also appreciated the retainer pads 40 may be incorporated into the one or more of walls 32/34. However, with the retainer pads 40 being fastenable to the walls 32/34, a differing material may be selected for the retainer pads 40, and the retainer pads 40 may also be replaced if wear develops.

In one embodiment, surfaces 47 may comprise a radius sized to match or be slightly larger than the radius of the ball mount 18. The receiver end of the clamshell housing of the releasable retention mechanism 20 optionally comprises endplates 38 that close off the far end of the housing. Spherical surfaces 47 of retainers 40 form a ring contact on both sides of the ball 18. Surfaces 47 may also comprise planar chamfers along the cylindrical opening of retainer pads 40, or semi-spherical cups. While two retainer pads 40 may be sufficient for retention, it is appreciated that a third pad may optionally be positioned to interface with the ball 18 in a plane perpendicular to the planes of retainer pads 40 (see cupped surface 49 in FIG. 4B or retainer pad 140c in FIG. 7A through FIG. 8B). Alternatively, a single hip-joint type enclosure may be employed in place of retainers 40 that partially surrounds ball 18, and allows for disconnect at certain orientations of moveable arm 12.

A variably adjustable clamp 30 (e.g. quick release camlock clamp having lever arm and threaded rod (collectively 30a) and nut 30b) shown in FIG. 1 through FIG. 5) couples the two walls 32/34 at the open top end, and allows for articulation of the second side wall 32 to pivot in open and closed orientations. The closed orientation (FIG. 1, FIG. 2, FIG. 4A and FIG. 5) clamps the cupped retainer pads 40 onto opposing surfaces of the ball 18, and may also clamp the proximal portion of the square body on the moveable cargo arm 12 between walls 32/34 to lock rotation or translation of the moveable cargo member 12 respect to the receiving arm 14 when the cargo arm 12 is disposed in the stowed or vertical orientation (FIG. 1 and FIG. 5). The side walls 32/34 may have flared ends 36 at the opening of the housing to guide the moveable arm 12 into the vertical orientation, particularly when cargo is attached.

A locking pin 28 may also secure the moveable arm 12 in the vertical orientation with respect to the receiving arm 14 while being stowed or during transport. Locking pin 28, while installed, passes through holes 39 in the walls 32, 34 and a hole 37 in the cargo arm 12 (see FIG. 3), and serves as an additional locking element in addition to clamp 32 to secure the moveable arm 12 while stowed or during transport.

As shown in FIG. 1 through FIG. 3, a dowel 42 may be attached to (e.g. press-fit, weld, bolt or similar attachment) to the stationary side wall 34, and serves as a stop for the moving side wall 32. Boss 42a on pin dowel 42 is configured to be received in an aperture 43 in moveable wall 32. When increasing closing force is applied to the walls 32/34 via clamp 30, the dowel 42 serves to stop motion of the far end of wall 32, forming a cantilever 32/34 that bends the open end of wall 32 to contact and secure the two walls 32/34 to the lower portion of the square body on the moveable cargo member 12. In the open orientation (which is incrementally variable by rotation of the cam lock 30), the clamping force on the ball 18 is released to allow for controlled rotation of the cargo arm 12 with respect to the receiving arm 14 and housing.

While rotation of cargo arm 12 is initially (1 DOF rotation is allowed until the arm 12 is free of walls 32/34) and primarily along the x axis perpendicular to the y-z plane (the z-axis being in line with receiving arm 14 and correspondingly receiver hitch 50—see FIG. 1, FIG. 6) it is appreciated that the ball mount 18 and cup 47 interface allows for controlled micro-orientation of the cargo arm 14 and cargo item 60 (once the cargo arm 124 clears walls 32, 34) in 3 degrees of freedom (DOF) angular orientation to adjust the cargo item with respect to one or more of the vehicle 51, ground 53 (see FIG. 9), or other object in relation to the hitch mount 10.

While the drawings depict "open" (FIG. 3, FIG. 4B) and "closed" (FIG. 1, FIG. 2, FIG. 4A and FIG. 5) configurations, there are effectively three primary orientations that are allowed from the infinite adjustment orientations (and resulting distance between opposing walls 32/34 and retainer pads 40) of variably adjustable clamp 30: 1) clamped and free of movement; 2) intermediately open or just loose enough to control the pressure/compressive force applied to the spherical ball from the retainer pads 40 to allow for controlled movement/rotation of the moveable cargo arm 12 with application of a small manual force and/or gravity; and 3) fully open to allow for the moveable cargo arm 12 to detach from the housing. The fully "open" (FIG. 3, FIG. 4B)

orientation allows the ball 18 of arm 12 to be removed from the cups 47 of the retainer pads 40, thus disconnecting the two members 12 and 14.

When the hitch mount 10 is used with respect to a trailer as the cargo item, it is appreciated that the cargo arm 12, and in particular ball 18 extend distally from the trailer to connect to the housing 25. In this configuration, the intermediately open orientation discussed above involved manipulation of the housing about ball 18 (which is generally static of fixed). Furthermore, an additional DOF may be added to such trailer-mounted configuration by adding a hinge (not shown) to the cargo arm 12 or receiving arm 14 (located between proximal end and distal end of the arm). An additional clamping mechanism (also not shown) may also be employed at the hinge to variably lock orientation of the hinge.

Referring to FIG. 6, end 16 of the moveable cargo arm 12 is configured to be coupled to an opening of receiver arm 64 of a cargo item (e.g. hitch ten frame 60a) to allow for releasable coupling of the cargo item 60. In the embodiment shown in FIG. 6, the hitch tent frame 60a comprises a plurality of platform frame members 62 that have retractable legs 66 that fold with respect to platform frame members 62 for a stowed orientation. Frame members 62 form a support for a planar surface (e.g. tent platform 172 (FIG. 9), small vehicle, or other cargo item). Each of the legs 66 have feet 68 that may be variable extended to accommodate for sloped or uneven ground. The top end of the platform frame members 62 have couplings 72, 74 for attaching legs 66, and members 62, as well forming a planar contact for tent platform or similar surface (see tent platform 172 in FIG. 9). Frame clamps 70 couple to cross-beams 76 to allow for the platform frame members 62 to be extended.

When the clamp 30 of releasable retention mechanism 20 is in an open orientation in a slightly released state (ball 18 and cupped surfaces 44 still in contact, but allowing for sliding motion) rotation of the cargo arm 12 with respect to the receiving arm 14 is allowed for 3 Degree of Freedom (DOF) rotational adjustment: pitch (about x-axis of ball 18), roll (about z-axis of ball 18) and yaw (about y-axis of ball 18). An additional DOF in translation may be added via possible extension of the receiver arm 64 with respect to the moveable cargo arm 12. Thus, the moveable cargo arm 12 may be pitched/rotated upward to be locked (with use of a locking pin 28 and closing the clamp 30) in a vertical stowed orientation with respect to the vehicle during travel (see FIG. 9). The front ends 36 of the side walls flare outward to promote proper yaw orientation while receiving the arm 12 within the opening of the housing. When the moveable arm 12 (and any attached cargo such as tent frame 60a and tent 170 (FIG. 9)) is in the deployed state while the receiving arm 14 is mounted to receiver hitch 50, the arm 12 may be oriented in pitch, yaw, and roll to allow orientation of the cargo to the desired deployed state.

When at a desired location for tent camping, the clamp 30 is loosened, allowing for pitch of the moveable cargo arm 12 and tent frame 60a (which may have tent 60b attached) downward toward a horizontal orientation and the ground 53. Two of the feet 68 may be deployed to touch the ground to partially support the cargo, and fine adjustments in pitch and roll may be made to adjust the orientation of the moveable cargo receiving arm 12 so that it and tent frame 60a, is level to the ground, thus providing an optimally level platform for the tent 170 even though the vehicle is on uneven or non-level ground. One or more bubble levels (not shown), or similar leveling devices, may be incorporated at two sides of the moveable arm 12 or surfaces of the cargo item 60 to aid in adjustment. Adjustment in yaw may also be done if necessary to avoid non-optimal mounting surfaces.

Once the desired orientation is achieved (such orientation may be temporarily locked by re-tightening the clamp), the rear legs 66 and feet 68 (same side as the hitch mount 10) are deployed/variably extended to contact the ground at respective locations to fully support the tent. The clamp 30 may then be loosened so that the plates 32/34 are in the fully open configuration, allowing detachment of the two members 12/14.

Figure 7A:
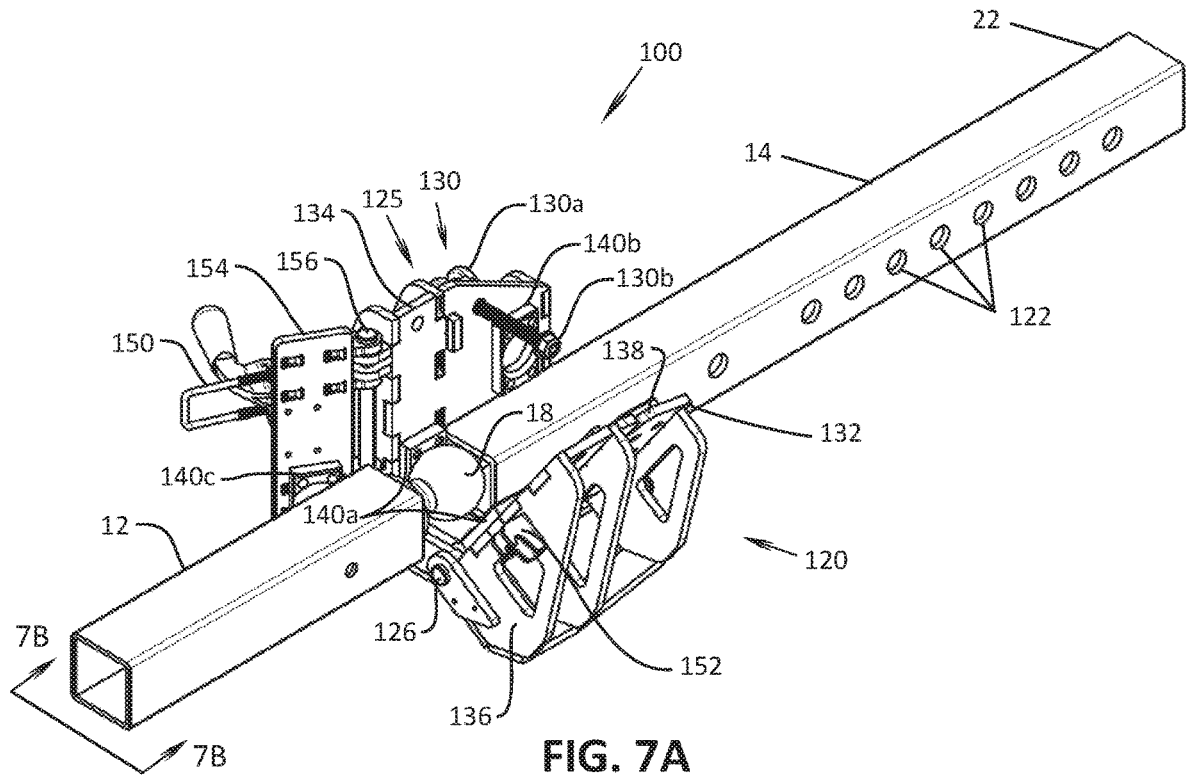
FIG. 7A illustrates a perspective view of an alternative embodiment of a variable hitch mount with the clamshell releasable retention mechanism in an open position and cargo arm in a deployed orientation.
Figure 7B:
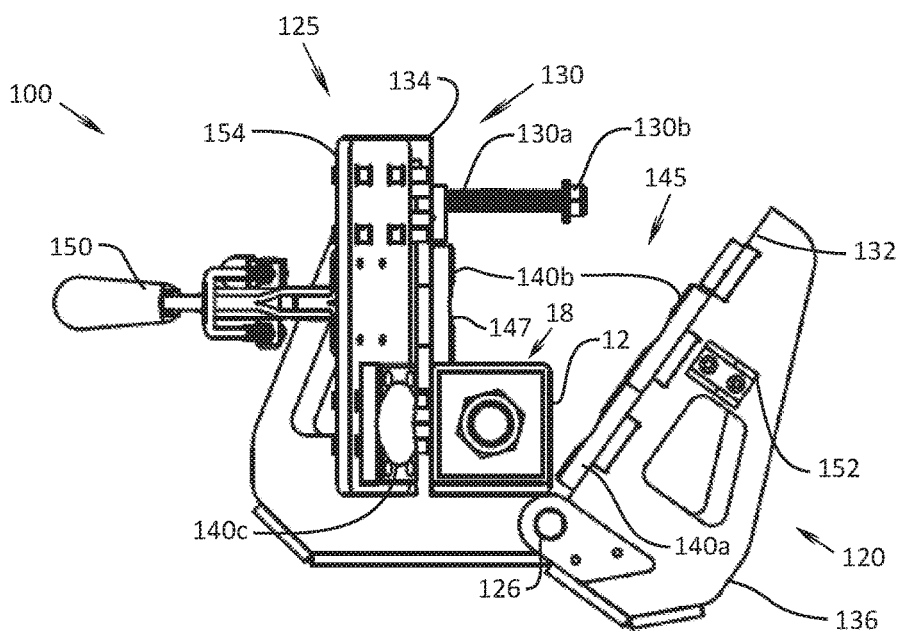
FIG. 7B shows a front view of the orientation of the variable hitch mount shown in FIG. 7A.
Figure 8A:
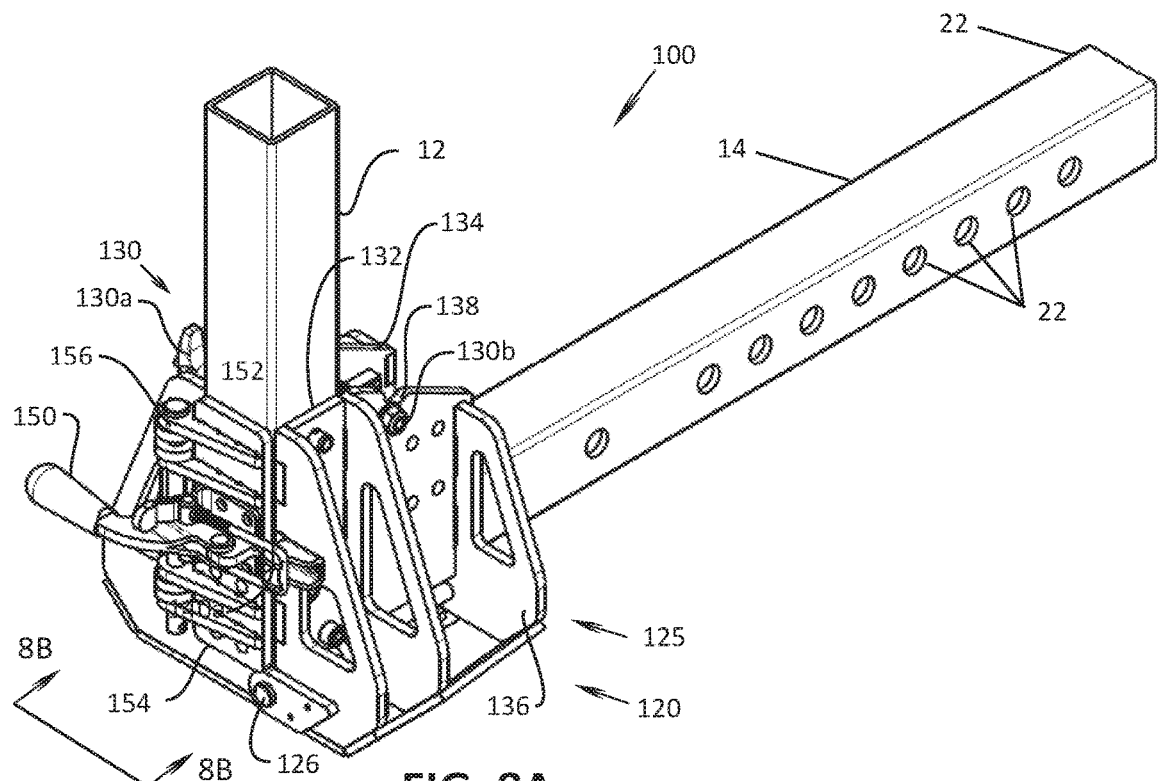
FIG. 8A illustrates a perspective view of the hitch mount of FIG. 7A with the clamshell releasable retention mechanism in a closed position and cargo arm in a stowed orientation.
Figure 8B:
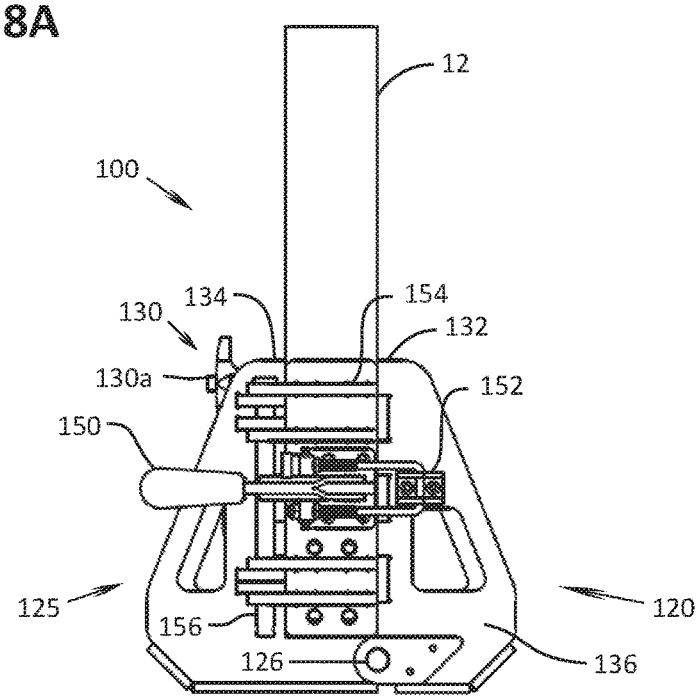
FIG. 8B shows a front view of the orientation of the variable hitch mount shown in FIG. 8A.
Figure 9:
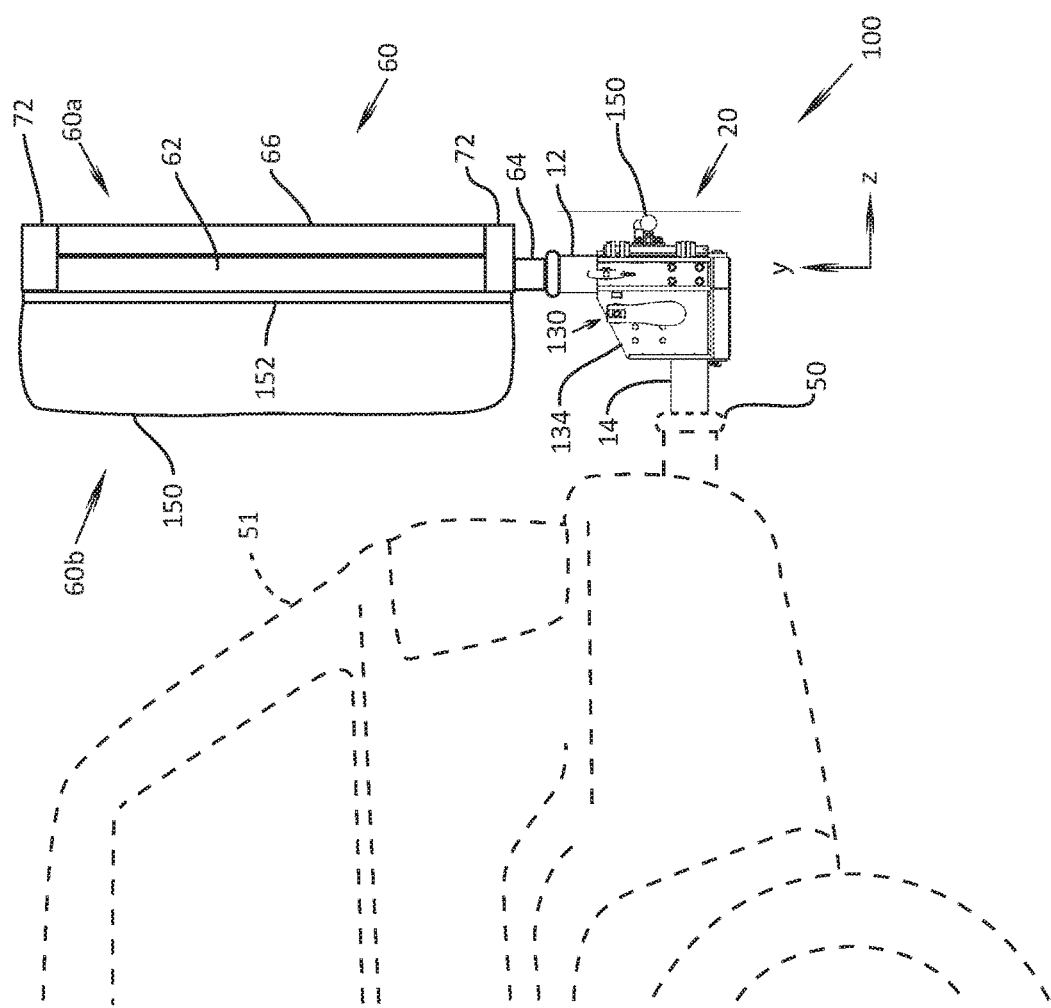
FIG. 9 is an image of the variable hitch mount shown in FIG. 7A through FIG. 8B with a hitch tent frame and tent in stowed orientation on a vehicle in accordance with the present description.

FIG. 7A through FIG. 8B show and alternative embodiment of a variable hitch mount 100 in accordance with the present description. FIG. 7A illustrates a perspective view of the hitch mount 100 with the clamshell releasable retention mechanism 120 in an open orientation and cargo arm 12 in a deployed orientation. FIG. 7B shows a front view of the orientation of the variable hitch mount 100 shown in FIG. 7A. FIG. 8A illustrates a perspective view of the hitch mount 100 with the clamshell releasable retention mechanism 120 in a closed orientation and cargo arm 12 in a stowed orientation. FIG. 8B shows a front view of the orientation of the variable hitch mount 100 shown in FIG. 8A.

Variable hitch mount 100 comprises clamshell releasable retention assembly or mechanism 120 that is configured to securely clamp on ball 18 of cargo arm 12 via a clamshell housing 125 comprising a stationary side wall 134 and movable side wall 132. The moveable wall 132 is rotationally attached to the wall 134 via a hinge 126. Both walls 132/134 may also include one or more gussets 136 to provide additional support to the housing.

Clamshell housing 125 is defined by a bottom end that supports the square tubing of end 24 of receiving arm 14 and two side walls 132, and 134 that form a cavity 145 having an open top end and open front end for receiving and reciprocation of the ball mount 18 of the moveable cargo arm 12. As shown in FIG. 7A through FIG. 8B, stationary side wall 134 may be c-shaped to form a one end of the cavity opposing wall 132 and a bottom end that encloses the bottom surface of the housing 125.

In the configuration shown in FIG. 7A through FIG. 8B, the housing 125 supports the square tubing of end 24 of receiving arm 14, e.g. via fastener, weld, or like attachment means. However it is appreciated that receiving arm 14 may be integral with housing 125. Receiving arm 14 may also comprise a plurality of lateral through holes 122 that allow for the receiving arm 24 to be inserted at various depths within the receiver hitch 50 to accommodate varying depths of the cargo item 60 when in the stowed configuration.

A variably adjustable clamp 130 (e.g. quick release camlock clamp having lever arm and threaded rod (collectively 130a) and nut 130b) couples the two walls 132/134 at the open top end, and allows for articulation of the second side wall 132 to pivot in open and closed orientations. The closed orientation clamps the forward cupped retainer pads 140a, which are positioned on opposing internal surfaces of walls 132/134 onto opposing surfaces of the ball 18, as well as the lower portion of the square body on the moveable cargo member 12 to lock rotation or translation of the moveable cargo member 12 with respect to the receiving arm 14 when the cargo arm 12 is disposed in the stowed orientation. Nut 130b and the threaded rod of lever 130a may slide into notch 138 in top of wall 132 to partially close the wall 132 about hinge 126. Rotation and/or actuation of lever 130a may then serve to provide micro or large clamping force of the pads 140a onto the ball 18.

A second set of aft retainer pads 140b may be positioned on opposing internal surfaces of walls 132/134 proximally and at an elevation within the housing 134. The aft retainer pads 140*b* form a second location for clamping hitch ball 18, such that motion of cargo arm 12 when deployed is inhibited at a certain point in x-axis rotation by means of the forward retainer pads 140*a* acting as a stop to the rectangular arm 12. This stopped orientation places the cargo arm 12, and thus cargo item 60, at a parallel orientation with the receiver hitch 50 axis.

Housing 125 may further comprise a second moveable wall in the form of a door 154 rotationally attached via vertical hinge 156 to arm 134 at the front opening of the housing 125. As seen in FIG. 8A and FIG. 8B, the door 154 closes the frontal opening of cavity 145 to further secure ball 18 via front retainer pad 140*c* that, when the door 154 is closed, clamps onto ball at an orientation perpendicular to forward retaining pads 140*a* or aft retaining pads 140*b*. All retaining pads 140*a*, 140*b*, and 140*c* preferably comprise a cupped spherical or beveled aperture 147 that is sized/shaped to interface with outer spherical surface of ball 18 of cargo arm 12, similar to cupped surface 47 of retaining pads 40 in the variable hitch mount 10 shown in FIG. 1 through FIG. 5.

Door 154 also comprises a quick release toggle clamp 150 that secures to latch 152 to secure the door 154 while the cargo arm 12 is in the stowed orientation. Toggle clamp 150 serves to act as a second or redundant clamping and/or locking mechanism to that of clamp 130, and locks cargo arm 12 in vertical orientation while in the stowed mode. To deploy the cargo arm to the orientation shown in FIGS. 7A and 7B, the toggle clamp 150 is first released from latch 152 on moving arm 132, allowing the door 154 to be opened. With loosening of clamp 130 (if not already loose), the cargo arm 12 may then be deployed downward in the x-axis and oriented accordingly as detailed above with respect to clamping mechanism 20 in FIG. 1 through FIG. 6. While variable hitch mount 10 is shown employed with hitch tent frame 60*a* in FIG. 6, it is appreciated that the variable hitch mount 100 may be interchanged accordingly, and the discussion above relating to FIG. 6 may be similarly applied to variable hitch mount 100.

FIG. 9 shows a side view of the variable hitch mount 100 shown in FIG. 7A through FIG. 8B with a cargo item 60 comprising hitch tent frame 60*a* and tent 60*b* in stowed orientation on a vehicle 51 via receiver hitch 50. Variable hitch mount 10 of FIG. 1 through FIG. 5 may be similarly employed. Tent 60*b* comprises a planar platform 172 and collapsible tent 170 that are attached to members 62 of the frame 60*a*. To deploy from the vertical orientation shown in FIG. 9 to a horizontal orientation with respect to the ground 53 or vehicle receiver hitch 50, the toggle clamp 150 is first unlatched to open door 154. The clamp 130 is then loosened to allow lessen the force of the retainer pads 140*a* (or aft retainer pads 140*b* if so employed), allowing the moveable cargo arm 12 to be oriented to the desired location with respect to ground 53 or and/or vehicle 51. While the aft retaining pads 140*b*, when used, stop the motion of the moveable cargo arm 12 to a orientation parallel to the x-z plane of the receiver hitch 50, retaining pads 140*b*, when used, do not have any restriction, and may be aligned with other surfaces, e.g. level when the ground 53/vehicle 51 are not level.

From the description herein, it will be appreciated that that the present disclosure encompasses multiple embodiments which include, but are not limited to, the following:

1. An apparatus for variably deploying and stowing cargo on a vehicle, the apparatus comprising: a receiving arm having a first end sized for insertion into an opening of a vehicle receiver hitch and a second end comprising a releasable retention mechanism; a moveable cargo arm having a distal end comprising rectangular or square tubing for coupling to a cargo item and a proximal end terminating at a ball mount configured to be received in a housing of the releasable retention mechanism; the housing coupled to the second end of the receiving arm and comprising first and second side plates that form an open top end and open front end for receiving the ball mount of the receiving arm; wherein at least one of the plates is rotationally attached to the housing and the first and second plates are coupled to each other via a clamp to allow for articulation of the first plate with the second side plate from open and closed positions; wherein in the closed position the plates are clamped to form a frictional contact with opposing surfaces of the spherical ball to lock or inhibit rotation of the moveable cargo arm with respect to the receiving arm; wherein in the open position the plates are released to lessen or remove the frictional contact to allow one or more of rotation of the moveable cargo arm about the ball mount to allow for adjustment of the moveable cargo arm with respect to the receiving arm.

2. The apparatus or method of any preceding or subsequent embodiment, wherein the first and second plates comprise opposing cupped surfaces matching the surface of the ball.

3. The apparatus or method of any preceding or subsequent embodiment, wherein in the closed position, the plates are also configured to also contact flat surfaces of the moveable cargo arm to further lock rotation and translation of the moveable cargo arm with respect to the receiving arm.

4. The apparatus or method of any preceding or subsequent embodiment, further comprising a retractable tent frame coupled to the moveable cargo arm, wherein the tent frame is disposed in a retracted state while the moveable cargo arm is in a stowed configuration within the housing for travel and may be deployed to a expanded configuration after the moveable cargo arm is rotated to a deployed state for coupling the tent frame to a ground surface.

5. The apparatus or method of any preceding or subsequent embodiment, wherein the moveable cargo member may be rotated in 3 degrees of freedom with respect to the receiving arm when the first and second plates are in the open configuration.

6. A method of deploying and stowing a hitch-based cargo item using any of the previous embodiments.

7. An apparatus for variably deploying and stowing cargo to a vehicle, the apparatus comprising: a receiving arm having a first end sized for insertion into an opening of a vehicle receiver hitch and a second end comprising a releasable retention assembly having a clamshell housing; a moveable cargo arm having a distal end comprising rectangular tubing for coupling to a cargo item and a proximal end terminating at a spherical ball mount configured to be received in a cavity of the housing; wherein the housing is coupled to the second end of the receiving arm and comprises first and second opposing side walls that form said cavity, the cavity having a substantially open top end and open front end for receiving and reciprocation of the ball mount and at least a portion of the receiving arm; wherein at least one of the side walls is rotationally attached to the housing to allow articulation of the first wall with respect to the second wall; a variably adjustable clamp coupled to the first and second side walls to allow for controlled articulation of the first side wall with the second side wall between open and closed orientations; wherein in the closed orientation the first and second side walls are clamped to form a frictional contact with one or more surface locations of the outer surface of the spherical ball to lock or inhibit rotation of the moveable cargo arm with respect to the receiving arm; and wherein in the open orientation the first and second side walls are released to lessen or remove the frictional contact to allow rotation of the moveable cargo arm about the ball mount to and adjustment of the moveable cargo arm with respect to the receiving arm.

8. The apparatus or method of any preceding or subsequent embodiment, wherein the first and second side walls comprise opposing cupped surfaces located on opposing internal walls of the cavity, the cupped surfaces being sized and shaped to mate with the outer surface of the spherical ball.

9. The apparatus or method of any preceding or subsequent embodiment, the housing further comprising a third cupped surface located within the cavity at an orientation perpendicular to the first and second cupped surfaces.

10. The apparatus or method of any preceding or subsequent embodiment, wherein the third cupped surface is positioned on a third wall disposed at a front opening of the cavity, the third wall being moveable between an open orientation allowing for insertion or articulation of the cargo arm in the cavity and a closed orientation clamping the third cupped surface on to the outer surface of the spherical ball to secure the spherical surface and cargo arm in a locked orientation with respect to the receiving arm.

11. The apparatus or method of any preceding or subsequent embodiment, wherein in the closed orientation, the first and second side walls are oriented with respect to the cargo arm to contact one or more planar surfaces of the moveable cargo arm to further lock rotation and translation of the moveable cargo arm with respect to the receiving arm with in a stowed orientation.

12. The apparatus or method of any preceding or subsequent embodiment, wherein the receiver hitch is mounted in a substantially horizontal orientation with respect to the vehicle; wherein the in the closed orientation, the cargo arm is locked in a vertical stowed orientation with respect to the vehicle; wherein the in the open orientation, the cargo arm is configured controllably articulate via application of a manual force toward a substantially horizontal deployed orientation with respect to the vehicle.

13. The apparatus or method of any preceding or subsequent embodiment, wherein the variably adjustable clamp is positioned with respect to the first and second side wall to allow for micro-adjustment of the orientation between the first and second walls and resulting distance between the first and second walls to vary a compressive force applied on the spherical ball from the opposing cupped surfaces; wherein in the closed orientation the cargo arm is locked in a vertical orientation with respect to the vehicle receiver hitch; wherein in the open orientation, micro-adjustment of the variably adjustable clamp allows for micro-orientation of the cargo arm toward a deployed or horizontal orientation with respect to the receiving arm in 3 degrees of freedom (DOF) with respect to the spherical ball to a affect a desired orientation of the cargo arm in one or more axes.

14. The apparatus or method of any preceding or subsequent embodiment, further comprising a retractable cargo frame configured to be releasably received on the cargo arm, the retractable cargo frame comprising: one or more frame members configured to couple to or form a platform; one or more retractable legs pivotably attached to the one or more frame members; wherein the one or more retractable legs are disposed to fold with respect to the frame members when the cargo arm is positioned in a stowed or vertical orientation with respect to the receiving arm; wherein the one or more retractable legs are disposed to extend with respect to the frame members to couple to a ground surface when the cargo arm is positioned in a deployed or vertical orientation with respect to the receiving arm; and wherein in the deployed state, said micro-orientation of the cargo arm allows for leveling of the platform with respect to the ground surface.

15. The apparatus or method of any preceding or subsequent embodiment, the cargo item further comprising: a collapsible tent coupled to the platform of the retractable cargo frame; wherein the tent is positioned on the retractable cargo frame to allow it to collapse toward the frame and platform while the cargo arm is positioned in a stowed or vertical orientation with respect to the receiving arm; and wherein upon deploying and micro-orientation of the cargo arm and extension of the one or more retractable legs, the tent is positioned to expand outward from the platform to form an enclosure above the platform.

16. A vehicle hitch tent, comprising: a retractable frame comprising a receiver and one or more frame members configured to couple to or form a platform; a collapsible tent coupled to the platform of the retractable frame; a variable hitch mount comprising: a receiving arm having a first end sized for insertion into an opening of a vehicle receiver hitch and a second end comprising a releasable retention assembly having a clamshell housing; a moveable cargo arm having a distal end comprising rectangular tubing for being releasably received in the receiver of the retractable frame and a proximal end terminating at a spherical ball mount configured to be received in a cavity of the housing; wherein the housing is coupled to the second end of the receiving arm and comprises first and second opposing side walls that form said cavity, the cavity having a substantially open top end and open front end for receiving and reciprocation of the ball mount and at least a portion of the receiving arm; wherein at least one of the side walls is rotationally attached to the housing to allow articulation of the first wall with respect to the second wall; a variably adjustable clamp coupled to the first and second side walls to allow for controlled articulation of the first side wall with the second side wall between open and closed orientations; wherein in the closed orientation the first and second side walls are clamped to form a frictional contact with one or more surface locations of the outer surface of the spherical ball to lock or inhibit rotation of the moveable cargo arm and retractable frame with respect to the receiving arm; wherein in the open orientation the first and second side walls are released to lessen or remove the frictional contact to allow rotation of the moveable cargo arm about the ball mount to and adjustment of the moveable cargo arm with respect to the receiving arm.

17. The apparatus or method of any preceding or subsequent embodiment, wherein the first and second side walls comprise opposing cupped surfaces located on opposing internal walls of the cavity, the cupped surfaces being sized and shaped to mate with the outer surface of the spherical ball.

18. The apparatus or method of any preceding or subsequent embodiment, the housing further comprising a third cupped surface located within the cavity at an orientation perpendicular to the first and second cupped surfaces.

19. The apparatus or method of any preceding or subsequent embodiment, wherein the third cupped surface is positioned on a third wall disposed at a front opening of the cavity, the third wall being moveable between an open orientation allowing for insertion or articulation of the cargo arm in the cavity and a closed orientation clamping the third cupped surface on to the outer surface of the spherical ball to secure the spherical surface and cargo arm in a locked orientation with respect to the receiving arm.

20. The apparatus or method of any preceding or subsequent embodiment, wherein in the closed orientation, the first and second side walls are oriented with respect to the cargo arm to contact one or more planar surfaces of the moveable cargo arm to further lock rotation and translation of the moveable cargo arm with respect to the receiving arm with in a stowed orientation.

21. The apparatus or method of any preceding or subsequent embodiment, wherein the receiver hitch is mounted in a substantially horizontal orientation with wherein the in the closed orientation, the cargo arm is locked in a vertical stowed orientation with respect to the vehicle; wherein the in the open orientation, the cargo arm is configured controllably articulate via application of a manual force toward a substantially horizontal deployed orientation with respect to the vehicle.

22. The apparatus or method of any preceding or subsequent embodiment, wherein the variably adjustable clamp is positioned with respect to the first and second side wall to allow for micro-adjustment of the orientation between the first and second walls and resulting distance between the first and second walls to vary a compressive force applied on the spherical ball from the opposing cupped surfaces; wherein in the closed orientation the cargo arm is locked in a vertical orientation with respect to the vehicle receiver hitch; wherein in the open orientation, micro-adjustment of the variably adjustable clamp allows for micro-orientation of the cargo arm toward a deployed or horizontal orientation with respect to the receiving arm in 3 degrees of freedom (DOF) with respect to the spherical ball to a affect a desired orientation of the cargo arm in one or more axes.

23. The apparatus or method of any preceding or subsequent embodiment, wherein the retractable frame further comprises one or more retractable legs pivotably attached to the one or more frame members; wherein the one or more retractable legs are disposed to fold with respect to the frame members when the cargo arm is positioned in a stowed or vertical orientation with respect to the receiving arm; wherein the one or more retractable legs are disposed to extend with respect to the frame members to couple to a ground surface when the cargo arm is positioned in a deployed or vertical orientation with respect to the receiving arm; and wherein in the deployed state, said micro-orientation of the cargo arm allows for leveling of the platform with respect to the ground surface; wherein the tent is positioned on the retractable cargo frame to allow it to collapse toward the frame and platform while the cargo arm is positioned in a stowed or vertical orientation with respect to the receiving arm; and wherein upon deploying and micro-orientation of the cargo arm and extension of the one or more retractable legs, the tent is positioned to expand outward from the platform to form an enclosure above the platform.

24. A method for variably deploying and stowing cargo to a vehicle, the method comprising: inserting a first end of a receiving arm into an opening of a vehicle receiver hitch and the second end of the receiving arm being coupled a releasable retention assembly having a clamshell housing; the clamshell housing having a cavity for receiving a spherical ball mount disposed at a proximal end of a moveable cargo arm having a distal end comprising rectangular tubing for coupling to a cargo item; wherein the housing is coupled to the second end of the receiving arm and comprises first and second opposing side walls that form said cavity, the cavity having a substantially open top end and open front end for receiving and reciprocation of the ball mount and at least a portion of the receiving arm; wherein at least one of the side walls is rotationally attached to the housing to allow articulation of the first wall with respect to the second wall; actuating a variably adjustable clamp coupled to the first and second side walls for controlled articulation of the first side wall with the second side wall between open and closed orientations; wherein in the closed orientation the first and second side walls are clamped to form a frictional contact with one or more surface locations of the outer surface of the spherical ball to lock or inhibit rotation of the moveable cargo arm with respect to the receiving arm; and wherein in the open orientation the first and second side walls are released to lessen or remove the frictional contact to allow rotation of the moveable cargo arm about the ball mount to and adjustment of the moveable cargo arm with respect to the receiving arm.

25. The apparatus or method of any preceding or subsequent embodiment, wherein the cargo item comprises a retractable cargo frame configured to be releasably received on the cargo arm, the retractable cargo frame comprising one or more frame members configured to couple to or form a platform and one or more retractable legs pivotably attached to the one or more frame members, the method further comprising: folding the one or more retractable legs with respect to the frame members to position the cargo arm is in a stowed or vertical orientation with respect to the receiving arm; and extending the one or more retractable legs with respect to the frame members to couple to a ground surface after the cargo arm is positioned in a deployed or vertical orientation with respect to the receiving arm; wherein in the deployed state, said micro-orientation of the cargo arm allows for leveling of the platform with respect to the ground surface.

26. The apparatus or method of any preceding or subsequent embodiment, wherein the cargo item further comprises a collapsible tent coupled to the platform of the retractable cargo frame, the method further comprising: collapsing the tent toward the frame and platform to position the cargo arm in a stowed or vertical orientation with respect to the receiving arm; and after deploying and micro-orientation of the cargo arm and extension of the one or more retractable legs, expanding the tent outward from the platform to form an enclosure above the platform.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

It is understood that components in various embodiments disclosed herein may be interchangeably implemented in other embodiments, whether or not illustrated in the according combination.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for variably deploying and stowing cargo to a vehicle, the apparatus comprising:
   a receiving arm having a first end sized for insertion into an opening of a vehicle receiver hitch and a second end comprising a releasable retention assembly having a clamshell housing;
   a moveable cargo arm having a distal end comprising rectangular tubing for coupling to a cargo item and a proximal end terminating at a spherical ball mount configured to be received in a cavity of the housing;
   wherein the housing is coupled to the second end of the receiving arm and comprises first and second opposing side walls that form said cavity, the cavity having a substantially open top end and open front end for receiving and reciprocation of the ball mount and at least a portion of the receiving arm;
   wherein at least one of the side walls is rotationally attached to the housing to allow articulation of the first wall with respect to the second wall;
   a variably adjustable clamp coupled to the first and second side walls to allow for controlled articulation of the first side wall with the second side wall between open and closed orientations;
   wherein in the closed orientation the first and second side walls are clamped to form a frictional contact with one or more surface locations of the outer surface of the spherical ball to lock or inhibit rotation of the moveable cargo arm with respect to the receiving arm; and
   wherein in the open orientation the first and second side walls are released to lessen or remove the frictional contact to allow rotation of the moveable cargo arm about the ball mount to and adjustment of the moveable cargo arm with respect to the receiving arm.

2. The apparatus of claim 1, wherein the first and second side walls comprise opposing cupped surfaces located on opposing internal walls of the cavity, the cupped surfaces being sized and shaped to mate with the outer surface of the spherical ball.

3. The apparatus of claim 2, the housing further comprising a third cupped surface located within the cavity at an orientation perpendicular to the first and second cupped surfaces.

4. The apparatus of claim 3, wherein the third cupped surface is positioned on a third wall disposed at a front opening of the cavity, the third wall being moveable between an open orientation allowing for insertion or articulation of the cargo arm in the cavity and a closed orientation clamping the third cupped surface on to the outer surface of the spherical ball to secure the spherical surface and cargo arm in a locked orientation with respect to the receiving arm.

5. The apparatus of claim 2, wherein in the closed orientation, the first and second side walls are oriented with respect to the cargo arm to contact one or more planar surfaces of the moveable cargo arm to further lock rotation and translation of the moveable cargo arm with respect to the receiving arm with in a stowed orientation.

6. The apparatus of claim 2:
   wherein the receiver hitch is mounted in a substantially horizontal orientation with respect to the vehicle;
   wherein the in the closed orientation, the cargo arm is locked in a vertical stowed orientation with respect to the vehicle;
   wherein the in the open orientation, the cargo arm is configured controllably articulate via application of a manual force toward a substantially horizontal deployed orientation with respect to the vehicle.

7. The apparatus of claim 2:
wherein the variably adjustable clamp is positioned with respect to the first and second side wall to allow for micro-adjustment of the orientation between the first and second walls and resulting distance between the first and second walls to vary a compressive force applied on the spherical ball from the opposing cupped surfaces;
wherein in the closed orientation the cargo arm is locked in a vertical orientation with respect to the vehicle receiver hitch;
wherein in the open orientation, micro-adjustment of the variably adjustable clamp allows for micro-orientation of the cargo arm toward a deployed or horizontal orientation with respect to the receiving arm in 3 degrees of freedom (DOF) with respect to the spherical ball to a affect a desired orientation of the cargo arm in one or more axes.

8. The apparatus of claim 7, further comprising a retractable cargo frame configured to be releasably received on the cargo arm, the retractable cargo frame comprising:
one or more frame members configured to couple to or form a platform;
one or more retractable legs pivotably attached to the one or more frame members;
wherein the one or more retractable legs are disposed to fold with respect to the frame members when the cargo arm is positioned in a stowed or vertical orientation with respect to the receiving arm;
wherein the one or more retractable legs are disposed to extend with respect to the frame members to couple to a ground surface when the cargo arm is positioned in a deployed or vertical orientation with respect to the receiving arm; and
wherein in the deployed state, said micro-orientation of the cargo arm allows for leveling of the platform with respect to the ground surface.

9. The apparatus of claim 7, the further comprising:
a collapsible tent coupled to the platform of the retractable cargo frame;
wherein the tent is positioned on the retractable cargo frame to allow it to collapse toward the frame and platform while the cargo arm is positioned in a stowed or vertical orientation with respect to the receiving arm; and
wherein upon deploying and micro-orientation of the cargo arm and extension of the one or more retractable legs, the tent is positioned to expand outward from the platform to form an enclosure above the platform.

10. A vehicle hitch tent, comprising:
a retractable frame comprising a receiver and one or more frame members configured to couple to or form a platform;
a collapsible tent coupled to the platform of the retractable frame;
a variable hitch mount comprising:
a receiving arm having a first end sized for insertion into an opening of a vehicle receiver hitch and a second end comprising a releasable retention assembly having a clamshell housing;
a moveable cargo arm having a distal end comprising rectangular tubing for being releasably received in the receiver of the retractable frame and a proximal end terminating at a spherical ball mount configured to be received in a cavity of the housing;
wherein the housing is coupled to the second end of the receiving arm and comprises first and second opposing side walls that form said cavity, the cavity having a substantially open top end and open front end for receiving and reciprocation of the ball mount and at least a portion of the receiving arm;
wherein at least one of the side walls is rotationally attached to the housing to allow articulation of the first wall with respect to the second wall;
a variably adjustable clamp coupled to the first and second side walls to allow for controlled articulation of the first side wall with the second side wall between open and closed orientations;
wherein in the closed orientation the first and second side walls are clamped to form a frictional contact with one or more surface locations of the outer surface of the spherical ball to lock or inhibit rotation of the moveable cargo arm and retractable frame with respect to the receiving arm;
wherein in the open orientation the first and second side walls are released to lessen or remove the frictional contact to allow rotation of the moveable cargo arm about the ball mount to and adjustment of the moveable cargo arm with respect to the receiving arm.

11. The hitch tent of claim 10, wherein the first and second side walls comprise opposing cupped surfaces located on opposing internal walls of the cavity, the cupped surfaces being sized and shaped to mate with the outer surface of the spherical ball.

12. The hitch tent of claim 11, the housing further comprising a third cupped surface located within the cavity at an orientation perpendicular to the first and second cupped surfaces.

13. The hitch tent of claim 12, wherein the third cupped surface is positioned on a third wall disposed at a front opening of the cavity, the third wall being moveable between an open orientation allowing for insertion or articulation of the cargo arm in the cavity and a closed orientation clamping the third cupped surface on to the outer surface of the spherical ball to secure the spherical surface and cargo arm in a locked orientation with respect to the receiving arm.

14. The hitch tent of claim 11, wherein in the closed orientation, the first and second side walls are oriented with respect to the cargo arm to contact one or more planar surfaces of the moveable cargo arm to further lock rotation and translation of the moveable cargo arm with respect to the receiving arm with in a stowed orientation.

15. The hitch tent of claim 11:
wherein the receiver hitch is mounted in a substantially horizontal orientation with respect to the vehicle;
wherein the in the closed orientation, the cargo arm is locked in a vertical stowed orientation with respect to the vehicle;
wherein the in the open orientation, the cargo arm is configured controllably articulate via application of a manual force toward a substantially horizontal deployed orientation with respect to the vehicle.

16. The hitch tent of claim 11:
wherein the variably adjustable clamp is positioned with respect to the first and second side wall to allow for micro-adjustment of the orientation between the first and second walls and resulting distance between the first and second walls to vary a compressive force applied on the spherical ball from the opposing cupped surfaces;

wherein in the closed orientation the cargo arm is locked in a vertical orientation with respect to the vehicle receiver hitch;

wherein in the open orientation, micro-adjustment of the variably adjustable clamp allows for micro-orientation of the cargo arm toward a deployed or horizontal orientation with respect to the receiving arm in 3 degrees of freedom (DOF) with respect to the spherical ball to a affect a desired orientation of the cargo arm in one or more axes.

17. The hitch tent of claim 16, wherein the retractable frame further comprises one or more retractable legs pivotably attached to the one or more frame members;

wherein the one or more retractable legs are disposed to fold with respect to the frame members when the cargo arm is positioned in a stowed or vertical orientation with respect to the receiving arm;

wherein the one or more retractable legs are disposed to extend with respect to the frame members to couple to a ground surface when the cargo arm is positioned in a deployed or vertical orientation with respect to the receiving arm; and wherein in the deployed state, said micro-orientation of the cargo arm allows for leveling of the platform with respect to the ground surface;

wherein the tent is positioned on the retractable cargo frame to allow it to collapse toward the frame and platform while the cargo arm is positioned in a stowed or vertical orientation with respect to the receiving arm; and wherein upon deploying and micro-orientation of the cargo arm and extension of the one or more retractable legs, the tent is positioned to expand outward from the platform to form an enclosure above the platform.

* * * * *